US011040674B1

(12) United States Patent
King

(10) Patent No.: US 11,040,674 B1
(45) Date of Patent: Jun. 22, 2021

(54) MOLD-IN CABLE, WIRE HARNESS AND COMPONENT RETAINER

(71) Applicant: Valeo North America, Inc., Troy, MI (US)

(72) Inventor: Robert King, Troy, MI (US)

(73) Assignee: Valeo North America, Inc., Troy, MI (US)

( * ) Notice: Subject to any disclaimer, the term of this patent is extended or adjusted under 35 U.S.C. 154(b) by 0 days.

(21) Appl. No.: 16/716,694

(22) Filed: Dec. 17, 2019

(51) Int. Cl.
*B60R 16/02* (2006.01)
*B60Q 1/04* (2006.01)
*B60Q 1/00* (2006.01)

(52) U.S. Cl.
CPC ........ *B60R 16/0215* (2013.01); *B60Q 1/0094* (2013.01); *B60Q 1/04* (2013.01)

(58) Field of Classification Search
CPC .. B60R 16/0215; B60R 16/0207; H02G 3/32; H02G 3/30; B60Q 1/0094; B60Q 1/04
See application file for complete search history.

(56) References Cited

U.S. PATENT DOCUMENTS

| 4,263,072 A | 4/1981 | Bull et al. | |
| 6,225,561 B1 * | 5/2001 | Mori | B60R 16/0207 |
| | | | 174/135 |
| 2019/0232896 A1 * | 8/2019 | Teba | F21S 45/00 |

* cited by examiner

*Primary Examiner* — Timothy J Thompson
*Assistant Examiner* — Amol H Patel
(74) *Attorney, Agent, or Firm* — Valeo North America, Inc.

(57) ABSTRACT

The present invention relates to wire harness and automotive component retention devices, and particularly to a mold-in retention feature in the automotive field for securing a wire harness to a light-signal housing comprising: first and second longitudinal flexible arms with engagement portions protruding from a flexible indentation or membrane on the housing where the first arm is juxtaposed opposite the second arm and where the associated arms are spaced away from each other in an open position and mate together in a closed position. The arms are configured to move from closed to open when a force is applied on the housing's backside so that depression of a flexible indentation or membrane causes associated arms to spread open and receive harness components. Furthermore, arms may move from open to closed position when an applied force is released on a flexible membrane so that a received harness component becomes secured between arms.

19 Claims, 3 Drawing Sheets

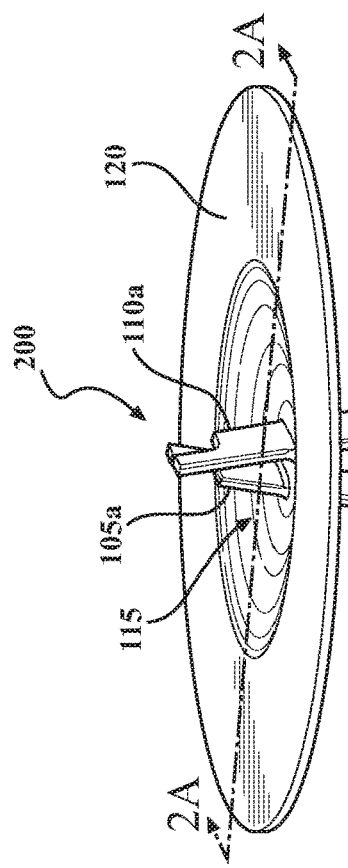
FIG. 1C
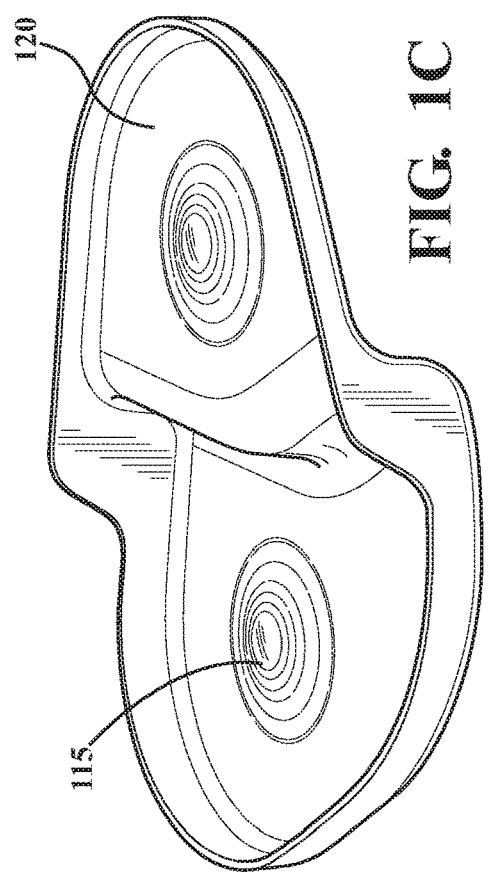
FIG. 2
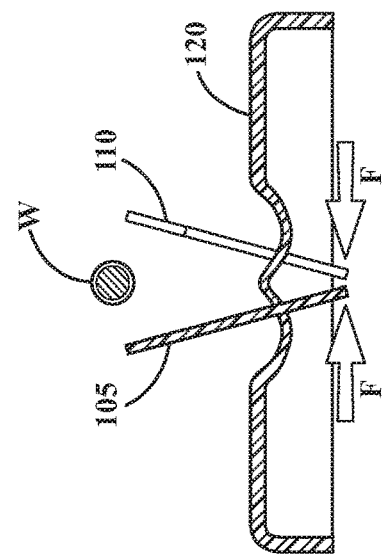
FIG. 2A1
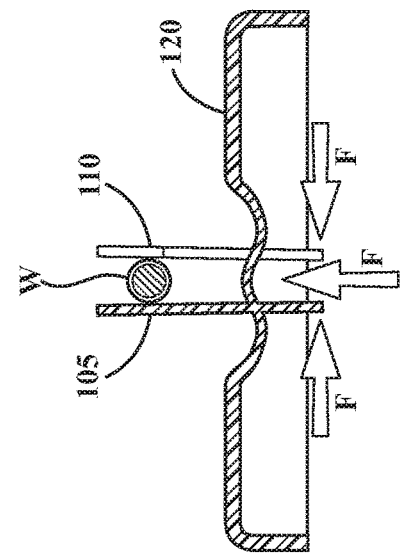
FIG. 2A2
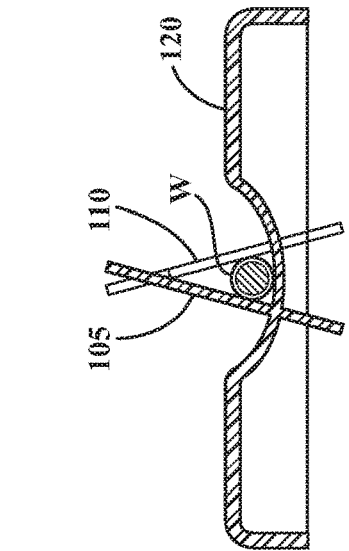
FIG. 2A3

MOLD-IN CABLE, WIRE HARNESS AND COMPONENT RETAINER

FIELD OF THE INVENTION

The present invention relates to cable, wire and electro-component retention devices, and more particularly, to a mold-in retainer for securing a wire harness or electrical components to a lighting device housing of a motor vehicle.

BACKGROUND

Efforts to reduce the complexity in the internal structure of vehicle lamps is an on-going endeavor among Original Equipment Manufacturers (OEM) and numerous component/system suppliers. Of particular interest is the desire to provide a mechanism to secure a wire harness in the vehicle lamp to a vehicle lamp's housing of the motor vehicle. The present invention is directed to one such innovation solution to provide a mold-in wire retainer, which can be used to secure the wire harness to the housing of the vehicle lamp and remove the secured wire harness without the use of any additional tools.

An electrical wire harness typically comprises a bundle of individual wires of varying gauges, impedances, and structure types, all arranged in a particular order. These wiring harnesses are typically bound together in order to facilitate the installation, repair and maintenance of the wires.

In the field of lighting modules of the vehicles, the wire harness may contain wires for different numerous applications in the vehicle headlamps. For instance, one or more wires or cables are required for supplying the power to the vehicle lamp from a vehicle power unit, and one or more wires are required to connect a printed circuit board in the vehicle lamp to a vehicle control unit and one or more electronic devices.

It is required to retain the wires of the wire harness in the design position. Failure to maintain the wire harness in the design position may cause problems during lamp assembling and disassembling, and may prevent the lamp to rotate or aim properly during the aiming process. Furthermore, wires that fall outside the confines or protrude out of the wire harness may interfere with other parts located nearby such that the wire harness is liable to be damaged.

One conventional wire harness retaining mechanism among vehicle lighting devices include ribs molded on the housing to retain the wire harness, but they would have to be twisted or maneuvered to install the wire harness.

Among the literature that may pertain to this technology includes patent document U.S. Pat. No. 4,263,072, incorporated herein by reference for all purposes.

Thus among various objectives that the subject invention addresses is an objective to simplify locating and retention of harness components in position as designed and avoid inadvertent rotation or movement of the associated components. Another objective is to avoid interference, pinching, damage or strain of harness components from un-managed or loosely secured arrangements. Another objective is to facilitate installer or servicer manipulation through overlapping finger features or simplified pop-up/depression force-application features. Another objective is to improve installation efficiencies during installation and removal of wire harness or component retained lamp housing parts. And yet another objective is to enhance product manufacturability through 3D print proto-typing of vehicle lamp module components.

The subject invention overcomes one or more problems or shortcomings known to be associated with such related cable-component harness retention mechanisms.

SUMMARY OF THE INVENTION

The present invention is directed to a unique solution to one or more of the problems discussed above. It is believed that the present invention provides a mold-in wire retainer for securing a wire harness to a motor vehicle's lamp housing. In particular, the present invention provides a mold-in wire retention feature that is molded to the housing, and a clip enables one to secure the wire harness to the housing of the vehicle lamp or to remove the secured wire harness from the housing—thus, enabling securing or removal without using additional tools.

Accordingly pursuant to a first aspect of the present invention, there is contemplated a mold-in wire retainer for securing a wire harness to a motor vehicle's housing of a lighting device, comprising: first and second longitudinal flexible arms having an engaging portion protruding from a flexible indentation (or similar flexible dimple, protrusion, pop-out membrane feature) provided on the housing, wherein the first arm is juxtaposed opposite to the second arm, and wherein the arms are spaced away from each other in an open position and mate with each other in a closed position; wherein the arms are configured to move from the closed position to the open position when a force is applied on the backside of the housing such that the flexible indentation is pushed upwards causing the arms to spread open to receive the wire harness between the arms; and wherein the arms are configured to move from the open position to the closed position by releasing the applied force such that the received wire harness is secured between the arms in the closed position.

The invention may further be characterized by one or any combination of features described herein, such as the engaging portions of the arms that include a stepped surface at their ends such that a stepped surface of the first arm mates with a stepped surface of the second arm to engage with each other; the first arm and the second arm are of different lengths; the first arm and the second arm of equal lengths; the lighting device is at least one of a headlamp and a rear lamp of the motor vehicle; the wire harness extends from a printed circuit board (PCB) in the lighting device to a plurality of electronic devices; the housing and the mold-in wire retainer are made of same material; the mold-in wire retainer is made from polypropylene; and the mold-in wire retainer is molded with the housing of the lighting device.

Accordingly, pursuant to a second aspect of the present invention, there is contemplated a mold-in wire retainer for securing a wire harness to a housing of a lighting device of motor vehicle, comprising: first and second longitudinal flexible arms having an engagement portion protruding from a top side of a flexible membrane or flexible indentation provided on the housing, and a disengagement portion protruding from a back side of the flexible membrane or indentation, wherein the first arm is juxtaposed opposing the second arm, and wherein the engaging portion of the arms are spaced away from each other in an open position, and the engagement portion of arms mate with each other in a closed position; wherein the arms are configured to move from the closed position to the open position when the arm's disengagement portions are deflected towards each other such that the flexible indentation or membrane is depressed or pushed upwards causing the arm's engagement portion to separate or spread open to receive the wire harness between the arm's engagement portion; and wherein the arms are configured to move from the open position to the closed position when the arm's disengagement portions are deflected away from each other such that received wire harness is secured between the engagement portion of the arms in the closed position.

The invention may be further characterized by one or any combination of the features described herein, such as the arms disengagement portions that are deflected towards each other when the disengaging portion of the arms are drawn towards each other by an applied force; the arms disengagement portions are deflected away from each other by releasing the applied force; the engaging portions of the arms include a stepped surface at arm ends such that a stepped surface of the first arm mates with a stepped surface of the second arm to engage with each other; the first arm and the second arm are of different lengths; the first arm and the second arm of equal lengths; the mold-in wire retainer is molded into a housing of the lighting device; the housing and the mold-in wire retainer are made of same material; and the mold-in wire retainer is made from polypropylene.

Accordingly, pursuant to a third aspect of the present invention, there is contemplated a lamp assembly for a motor vehicle, comprising: a housing; a bezel; a reflector mounted in the housing; a light source; a heat sink; a printed circuit board (PCB) mounted on a heat-sink and coupled to the light source; and one or more mold-in wire retainers molded onto the housing for securing a wire harness to the housing of a motor vehicle lighting device, comprising: first and second longitudinal flexible arms having an engagement portion protruding from a flexible indentation or flexible membrane provided on the housing, wherein the first arm is juxtaposed opposing the second arm, and wherein the arms are spaced away from each other in an open position and mates with each other in a closed position; wherein the arms are configured to move from the closed position to the open position when a force is applied on the backside of the housing such that the flexible indentation or membrane is depressed or pushed upwards causing the arms to spread open to receive the wire harness between the arms; and wherein the arms are configured to move from the open position to the closed position by releasing the applied force such that the received wire harness is secured between the arms in the closed position; and wherein the mold-in wire retainer is molded into a housing of the lighting device.

It should be appreciated that the above referenced aspects and examples are non-limiting, as others exist within the present invention, as shown and described herein.

DESCRIPTION OF DRAWINGS

FIG. 1A1 shows a section view 1A1 of FIG. 1A's housing portion that depicts where opposing engagement arms mate together to secure an exemplary wire harness between the arms in a closed position, according to the first embodiment of the present invention.

FIG. 1A2 shows section view 1A1 of FIG. 1A's housing portion that depicts opposing engagement arms in movement from the closed position to the open position when the flexible indentation is depressed or suitable force is applied causing the arms to spread open to receive-release an exemplary wire harness between the arms according to the first embodiment.

FIG. 1A3 shows section view 1A1 of FIG. 1A's housing portion that depicts opposing engagement arms spaced away in an open position so as to release an exemplary wire harness upon applied force at disengagement arm members according to the first embodiment.

FIG. 1C shows a bottom side view of FIG. 1A's housing portion and flexible indentation features, according to the first embodiment of the present invention.

FIG. 2 shows a detail view of a vehicle lamp's housing portion molded with a mold-in wire retainer and illustrates reference section cut plane 2A, according to a second embodiment the present invention.

FIG. 2A1 shows a section view 2A of FIG. 2's housing portion that depicts opposing engagement arms mating together to secure an exemplary wire harness between the arms in a closed position, according to the second embodiment.

FIG. 2A2 shows section view 2A of FIG. 2's housing portion that depicts opposing engagement arms in movement from a closed to open position when suitable force is applied causing the arms to spread open and receive-release an exemplary wire harness between the arms according to the second embodiment.

FIG. 2A3 shows section view 2A of FIG. 2's housing portion that shows opposing engagement arms spaced away in an open position so as to release an exemplary wire harness upon applied force at disengagement arm members according to the second embodiment.

DETAILED DESCRIPTION OF PREFERRED EMBODIMENTS

The present invention relates to a mold-in wire retainer for securing a wire harness to a housing of the motor vehicle's lamp. In particular, the present invention provides a mold-in wire retainer that is molded to the housing, and the clip enables one to secure the wire harness to the housing of the vehicle lamp and to remove the secured wire harness from the housing, without the use of any additional tools.

Unless defined otherwise, all technical and scientific terms used herein have the same meaning as commonly understood by one of ordinary skill in the art to which this technology belongs.

Figure 1A:
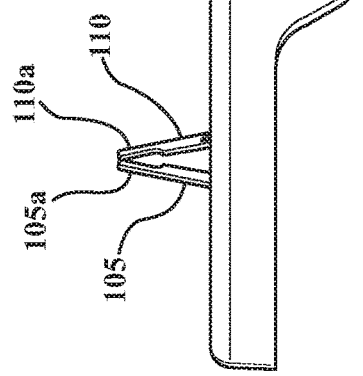
FIG. 1A shows a perspective view of a vehicle lamp's housing portion molded with a mold-in wire retainer and illustrates reference section cut plane 1A1, according to a first embodiment the present invention.
Figure 1B:
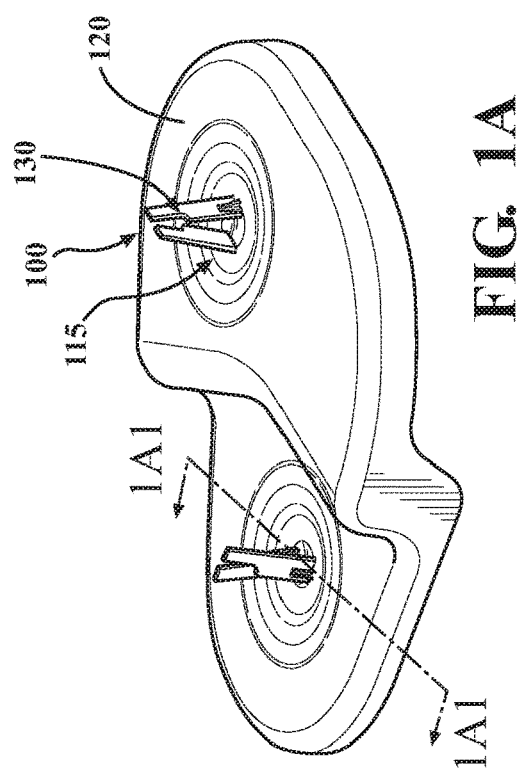
FIG. 1B shows a side view portion of FIG. 1A's housing, according to the first embodiment of the present invention.
Figure 1B:
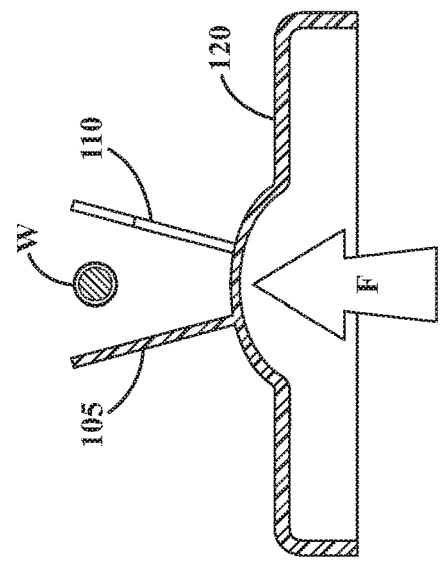
Figure 3A:
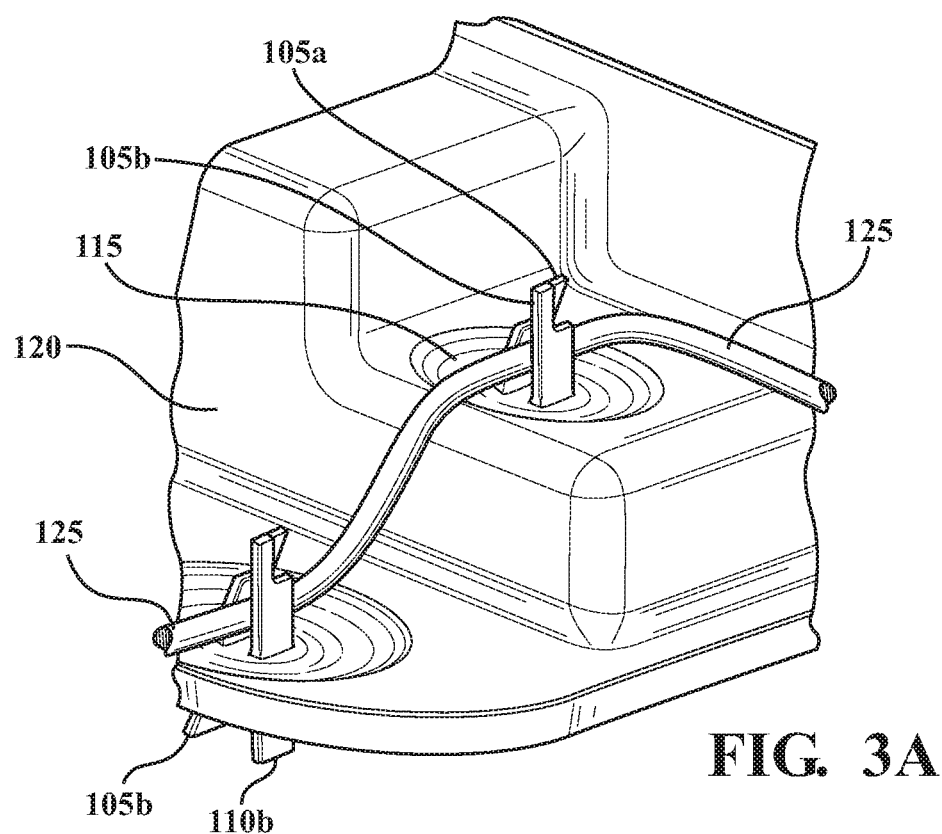
FIG. 3A shows mold-in wire retainer features with the wire harness in a closed position, according to the second embodiment of the present invention.
Figure 3B:
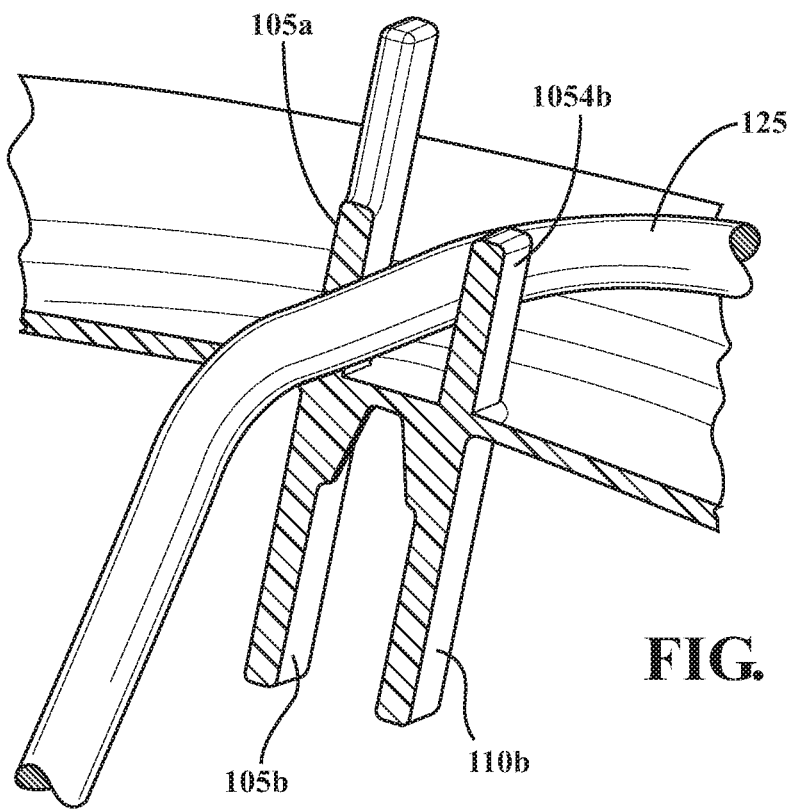
FIG. 3B shows a mold-in wire retainer features with the wire harness in the open position, according to the second embodiment of the present invention.

FIG. 1A shows a perspective view of a portion of a housing of a vehicle lamp molded with a mold-in wire retainer, according to a first embodiment the present invention. FIG. 1B shows a side view of the portion of the housing shown in the FIG. 1A, according to the first embodiment of the present invention. FIG. 1C shows a bottom side view of the portion of the housing shown in the FIG. 1A, according to the first embodiment of the present invention. FIG. 2 shows a perspective view of a portion of a housing of a vehicle lamp molded with a mold-in wire retainer, according to a second embodiment the present invention. FIG. 3A shows mold-in wire retainer with the wire harness in a closed position according to the second embodiment of the present invention. FIG. 3B shows a mold-in wire retainer with the wire harness in the open position, according to the second embodiment of the present invention.

FIG. 1A to FIG. 3B illustrates embodiments of a mold-in wire retainer for securing a wire harness to a housing of a lighting device of a motor vehicle, in particular to automobiles, according to the present invention. The lighting device or a vehicle lamp is at least one of a headlamp or a rear lamp of the motor vehicle. It is understood that the invention is also applicable to signaling devices for such vehicles to secure the wire harness in the signaling devices.

Typically, the mold-in wire retainer is used to retain wire harness bundles or components. The mold-in wire retainer is made preferably from a plastic material, for example, polypropylene, by using an injection molding process. It will be understood that the materials other than polypropylene that have similar properties as of the polypropylene can be used to manufacture the mold-in wire retainer.

FIG. 1A and FIG. 1B illustrate a first and preferred embodiment of a mold-in wire retainer for securing a wire harness to a housing of a lighting device. Hereinafter, the words, "lighting device" and "vehicle lamps" may be used interchangeably. As can be seen from FIG. 1A and FIG. 1B, the mold-in wire retainer 100 comprises a first longitudinal flexible arm 105 and a second longitudinal flexible arm 110, each having an engaging portion 105a, 110a protruding from a flexible indentation 115 provided on the housing 120. For the sake of brevity, only a portion of the housing 120 of the vehicle lamp is shown in the figures. The first longitudinal flexible arm 105 is juxtaposed opposite to the second longitudinal flexible arm 110, and the arms 105, 110 are away from each other in an open position and mate with each other in a closed position. The arms 105, 110 are configured to move from the closed position to the open position when a force is applied on the backside of the housing 120 at the flexible indentation 115 such that the flexible indentation 115 is pushed upwards causing the arms 105, 110 to spread open to receive the wire harness 125 (shown in the FIG. 3A) between the arms 105, 110. Further, the arms 105, 110 are configured to move from the open position to the closed position by releasing the applied force such that the received wire harness 125 is secured between the arms 105, 110 in the closed position.

In an embodiment, the engaging portions 105a, 105b of the arms 105, 110 include a stepped surface 130 at their ends such that a stepped surface of the first arm 105 mate with a stepped surface of the second arm 110 to engage with each other. In another embodiment, the engaging portion 105a, 105b of the arms 105, 110 include an angled surface at their ends such that an angled surface of the first arm 105 mate with an angled surface of the second arm 110 to engage with each other. It will be understood that the invention is not limited to the stepped surfaces and angled surfaces. It is specifically contemplated that such engaging portion ends may have any other suitable configuration, for example, ramp-like surfaces that allow engagement of the first arm 105 with the second arm 110.

In an embodiment, the first arm 105 and the second arm 110 are of same length, as shown in FIG. 1A and FIG. 1B. In an alternative embodiment, first arm 105 and second arm 110 are of different lengths. Lengths of the arms can be chosen based on design requirements and space availability in the lighting-signaling devices.

Referring to FIG. 2, FIG. 3A and FIG. 3B, various features of a second embodiment of a mold-in wire retainer for securing a wire harness to a housing of a lighting device will now be described. The second embodiment being described herein provides a disengaging portion 120a, 120b to unlock the arms. This embodiment provides a convenient means for disengaging the engaged arms.

The mold-in wire retainer 200 according to the second embodiment comprises: first and second longitudinal flexible arms 105, 110 having an engaging portion 105a, 105b protruding from a top side of a flexible indentation 115 provided on the housing 120, and a disengaging portion 105b, 110b protruding from a back side of the flexible indentation 115. The first arm 105 is juxtaposed opposite the second arm 110, and the engaging portion 105a, 110a of the arms 105, 110 are spaced away from each other in an open position, and mate with each other in a closed position. Arms 105, 110 are configured to move from the closed position to the open position when the disengaging portion 105b, 110b of the arms 105, 110 are deflected towards each other such that the flexible indentation 115 is pushed upwards causing the engaging portion 105a, 110a of the arms 105, 110 to spread open to receive the wire harness 125 (shown in FIG. 3A) between the engaging portion 105a, 110a of arms 105, 110. Furthermore, arms 105, 110 are configured to move from the open position to the closed position when the disengaging portion 105a, 110b of the arms 105, 110 are deflected away from each other such that received wire harness 125 is secured between the engaging portion 105b, 110b of the arms 105, 110 in the closed position.

The disengaging portion 105b, 110b of the arms 105, 110 are deflected towards each other when the disengaging portion 105b, 110b of the arms 105, 110 are pushed towards each other by applying force, and the arms 105, 110 are deflected away from each other by releasing the applied force. As illustrated in FIG. 3A and FIG. 3B, when the disengaging portion 105b, 110b of the arms 105, 110 are pushed toward each other, the engaging portion 105a, 110b of the arms 105, 110 are engaged with each other to secure the wire harness 125 therein.

Similar to the first embodiment, arms 105, 110 of the mold-in wire retainer 200 described in the second embodiment may be same or of different lengths. As can be seen from FIG. 3A, the arms 105, 110 are of same length holding the wire harness 125 between the arms 105, 110. Further, the arms 105, 110 are of different lengths, as shown in the FIG. 3B. Similar to the first embodiment, the mold-in wire retainer 200 described in the second embodiment is molded to the housing of the lighting device.

In an embodiment, the engaging portion 105a, 110a of the arms 105, 110 of the clip 200 include a stepped surface at their ends such that a stepped surface of the first arm mate with a stepped surface of the second arm to engage with each other. In another embodiment, the engaging portions 105a, 110a of the arms include an angled surface at their ends such that an angled surface of the first arm mate with an angled surface of the second arm to engage with each other. It will be understood to a person skilled in the art that the second embodiment of the present invention is not limited to the stepped surfaces or angled surfaces. It is specifically contemplated that such engaging portion 105a, 110a ends may have any other suitable configuration, for example, ramp like surfaces that allows to engage the first arm 105 with the second arm 110. When the arms 105, 110 are designed to have different lengths, at least one arm includes a stepped surface or an angled surface or any other suitable configuration at the ends of the engaged portion 105a, 110a, as shown in the FIG. 3B.

The present invention also provides a lamp assembly for a motor vehicle according to a third embodiment. The lamp assembly comprises a housing; a bezel; a reflector mounted in the housing; a light source; a heat sink; a printed circuit board (PCB) mounted on a heatsink and coupled to the light source; and one or more mold-in wire retainers molded on the housing for securing a wire harness to the housing of a lighting device of a motor vehicle. The mold-in wire retainer 100, 200 can be any of the mold-in wire retainers described with respect to the first embodiment and the second embodiment.

Thus, with the use of the mold-in wire retainer of the present invention, securing and removal of the wire harness 125 can be performed without the use of additional tools. Therefore, wear and damage of wire harness or component 125 can be prevented.

Although the present disclosure is described with reference to the 'wire harness', it will be understood to a person skilled in the art that the mold-in wire retainer of the present disclosure can be employed to retain PCB boards, bezel, and other lamp components where snaps are used to retain the same.

Although the present disclosure is provided with reference to figures, all of the embodiments shown in figures are intended to explain the preferred embodiments of the present invention by ways of examples, instead of being intended to limit the present invention.

It would be appreciated by those skilled in the art that various changes or modifications may be made in the present disclosure without departing from the principles and spirit of the disclosure, which are intended to be covered by the present invention as long as these changes or modifications fall within the scope defined in the claims and their equivalents.

Any numerical values recited herein include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner.

Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints.

The disclosures of all articles and references, including patent applications and publications are incorporated by reference for all purposes.

The term "consisting essentially of" describes a combination that shall include the elements, ingredients, components or steps identified, and such other elements ingredients, components or steps that do not materially affect the basic and novel characteristics of the combination.

LIST OF ELEMENT NUMBERS

Angled, stepped or feature surface 107
Bezel 122
Clip 200
First longitudinal flexible arm 105
Harness Component W
Heatsink 117
Lamp housing 120
Mold-in retainer 100
Motor vehicle 1
Printed Circuit Board (PCB) 133
Pliant-flexible structure 125

The invention claimed is:

1. A mold-in wire retainer for securing a wire harness to a lighting device housing of a motor vehicle, comprising:
 a first and a second longitudinal flexible arm having an engagement-portion protruding from a flexible indentation provided on said housing, wherein the first arm is juxtaposed opposite the second arm, and wherein said arms are spaced away from each other in an open position and mate with each other in a closed position;
 wherein said arms are configured to move from the closed position to the open position when a force is applied on a backside of said housing such that the flexible indentation is depressed causing the arms to spread open to receive the wire harness between said arms; and
 wherein said arms are configured to move from the open position to the closed position upon-releasing the applied force such that the wire harness that is secured between the arms in the closed position.

2. The mold-in wire retainer of claim 1, wherein the engagement portion of each respective arm includes a stepped surface at each respective end such that the-stepped surface of the first arm mates with the-stepped surface of the second arm to engage with each other.

3. The mold-in wire retainer of claim 1, wherein the first arm and the second arm are of different lengths.

4. The mold-in wire retainer of claim 1, wherein the first arm and the second arm of equal lengths.

5. The mold-in wire retainer of claim 1, wherein the lighting device is at least one of a headlamp and a rear lamp of the motor vehicle.

6. The mold-in wire retainer of claim 1, wherein the wire harness extends from a printed circuit board (PCB) in a lighting device to a plurality of electronic devices.

7. The mold-in wire retainer of claim 1, wherein said housing and the mold-in wire retainer are made of same material.

8. The mold-in wire retainer of claim 1, wherein the mold-in wire retainer is made from polypropylene.

9. The mold-in wire retainer of claim 1, wherein the mold-in wire retainer is molded to said housing of the lighting device.

10. A mold-in wire retainer for securing a wire harness to a housing of a lighting device of a motor vehicle, comprising:
 first and second longitudinal flexible arms having an engaging portion protruding from a top side of a flexible indentation provided on the housing, and a disengaging portion protruding from a back side of the flexible indentation, wherein the first arm is juxtaposed opposite to the second arm, and wherein the engaging portion of the arms are spaced away from each other in an open position, and mate with each other in a closed position;
 wherein the arms are configured to move from the closed position to the open position when the disengaging portions of the arms are deflected towards each other such that the flexible indentation is depressed causing the engaging portion of the arms to spread open to receive the wire harness between the engaging portions of the arms; and wherein the arms are configured to move from the open position to the closed position when the disengaging portions of the arms are deflected away from each other such that the received wire harness is secured between the engaging portions of the arms in the closed position.

11. The mold-in wire retainer of claim 10, wherein the disengaging portions of the arms are deflected towards each other when the disengaging portions of the arms are pushed towards each other by an applied force.

12. The mold-in wire retainer of claim 11, wherein the disengaging portions of the arms are deflected away from each other by releasing the applied force.

13. The mold-in wire retainer of claim 10, wherein the engaging portions of the arms include a stepped surface at each respective arm end such that a stepped surface of the first arm mates with a stepped surface of the second arm to engage one another.

14. The mold-in wire retainer of claim 10, wherein the first arm and the second arm are of different lengths.

15. The mold-in wire retainer of claim 10, wherein the first arm and the second arm of equal lengths.

16. The mold-in wire retainer of claim 10, wherein the mold-in wire retainer is molded to a housing of the lighting device.

17. The mold-in wire retainer of claim 10, wherein the housing and the mold-in wire retainer are made of same material.

18. The mold-in wire retainer of claim 10, wherein the mold-in wire retainer is made from polypropylene.

19. A lamp assembly of a motor vehicle, comprising:
a housing;
a bezel;
a reflector mounted in the housing;
a light source;
a heat sink;
a printed circuit board (PCB) mounted on a heat sink and coupled to the light source; and
a number of mold-in wire retainers molded on the housing for securing a wire harness to the housing of a lighting device of a motor vehicle, comprising:
  first and second longitudinal flexible arms having an engaging portion protruding from a flexible indentation provided on the housing, wherein the first arm is juxtaposed opposite to the second arm, and wherein the arms are spaced away from each other in an open position and mate with each other in a closed position;
  wherein the arms are configured to move from the closed position to the open position when a force is applied on a backside of the housing such that when the flexible indentation is pushed the arms are caused to spread open to receive the wire harness between the arms; and
  wherein the arms are configured to move from the open position to the closed position by releasing the applied force such that the wire harness is secured between the arms in the closed position; and
  wherein the mold-in wire retainer is molded to the housing of the lighting device.

* * * * *